(12) United States Patent
Jones, Jr. et al.

(10) Patent No.: US 7,243,510 B2
(45) Date of Patent: ***Jul. 17, 2007

(54) REDUCED CARBON DIOXIDE EMISSION SYSTEM AND METHOD FOR PROVIDING POWER FOR REFRIGERANT COMPRESSION AND ELECTRICAL POWER FOR A LIGHT HYDROCARBON GAS LIQUEFACTION PROCESS

(75) Inventors: Richard Jones, Jr., Katy, TX (US); Patrick B. Ward, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/674,022

(22) Filed: Sep. 29, 2003

(65) Prior Publication Data

US 2004/0129019 A1    Jul. 8, 2004

Related U.S. Application Data

(60) Provisional application No. 60/414,806, filed on Sep. 30, 2002.

(51) Int. Cl.
*F25J 1/00* (2006.01)
*F02C 6/18* (2006.01)

(52) U.S. Cl. .......................... 62/612; 60/780

(58) Field of Classification Search ............... 62/612, 62/613, 611; 60/780
See application file for complete search history.

(56) References Cited

U.S. PATENT DOCUMENTS

| | | | | |
|---|---|---|---|---|
| 4,566,885 A | * | 1/1986 | Haak ........................... | 62/613 |
| 4,907,405 A | * | 3/1990 | Polizzotto .................... | 60/772 |
| 5,025,631 A | * | 6/1991 | Garbo .......................... | 60/655 |
| 5,295,350 A | * | 3/1994 | Child et al. ................... | 60/780 |
| 5,457,951 A | * | 10/1995 | Johnson et al. ............... | 60/780 |
| 5,689,141 A | | 11/1997 | Kikkawa et al. | |
| 6,248,794 B1 | | 6/2001 | Gieskes | |
| 6,272,882 B1 | | 8/2001 | Hodges et al. | |
| 6,318,065 B1 | | 11/2001 | Pierson | |
| 6,324,867 B1 | | 12/2001 | Fanning et al. | |
| 6,446,465 B1 | | 9/2002 | Dubar | |
| 7,131,272 B2 | * | 11/2006 | Jones et al. ................... | 60/670 |

FOREIGN PATENT DOCUMENTS

| | | |
|---|---|---|
| AU | 199658151 | 11/1996 |
| DE | 19517116 | 6/1996 |
| WO | 9733131 | 9/1997 |
| WO | 9836038 | 8/1998 |
| WO | 0140725 | 6/2001 |

OTHER PUBLICATIONS

"A Novel Concept" by H. Bauer *Hydrocarbon Engineering* May 2002 pp. 59-63.
General Electric Corporation—Gas Turbines.
PCT Search Reports—PCT/US03/30556 and PCT/03/30555.
Jones, Jr., et al., U.S. Appl. No. 10/674,212, filed Sep. 29, 2003.

* cited by examiner

*Primary Examiner*—William C. Doerrler
(74) *Attorney, Agent, or Firm*—John L. Wood; F. Lindsey Scott

(57) ABSTRACT

A reduced carbon dioxide emission system and method for providing power for refrigerant compression and shared electrical power for a light hydrocarbon gas liquefaction process.

20 Claims, 1 Drawing Sheet

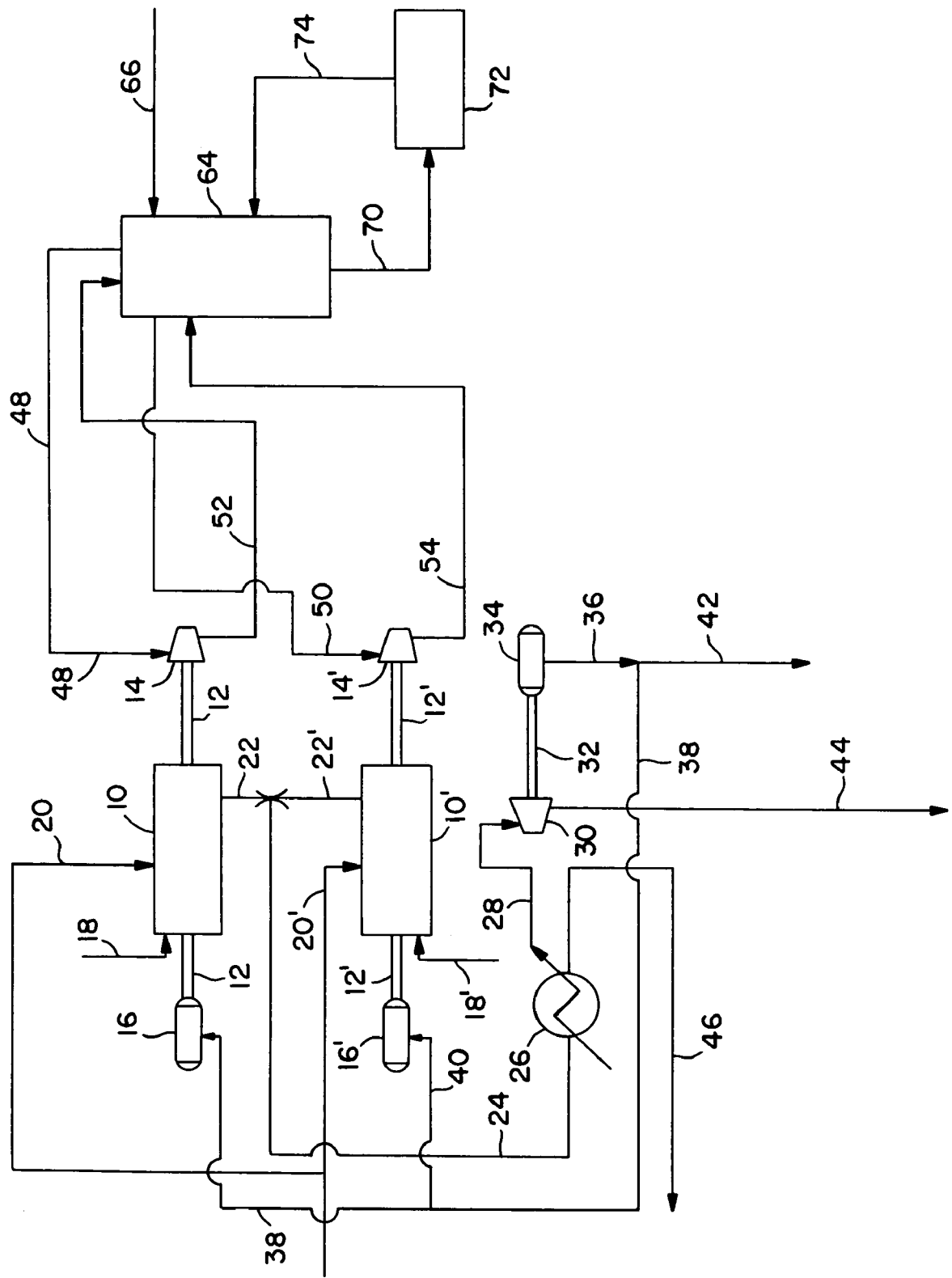

REDUCED CARBON DIOXIDE EMISSION SYSTEM AND METHOD FOR PROVIDING POWER FOR REFRIGERANT COMPRESSION AND ELECTRICAL POWER FOR A LIGHT HYDROCARBON GAS LIQUEFACTION PROCESS

RELATED APPLICATIONS

This application is entitled to and hereby claims the benefit of provisional application Ser. No. 60/414,806 filed Sep. 30, 2002.

FIELD OF THE INVENTION

This invention is related to a reduced carbon dioxide emission method for providing power for refrigerant compression and shared electrical power for a light hydrocarbon gas liquefaction process.

The invention further comprises a reduced carbon dioxide emission system for producing power for refrigerant compression and shared electrical power for a light hydrocarbon gas liquefaction process Typically the light hydrocarbon gas is natural gas, which may have been treated to at least partially remove acid gases, dewatered, and from which at least a portion of the hydrocarbon gases heavier than about $C_3$ may have been removed.

BACKGROUND OF THE INVENTION

In recent years, there has been continuing interest in liquefying natural gas and other light hydrocarbon gases at remote sites where there is little or no nearby market for the natural gas. Natural gas located at such remote sites is of market value only if it can be pipelined or otherwise transported to a marketplace. In many instances, it is not feasible to construct pipelines to transport such natural gas. Therefore, in many instances it has been found desirable to liquefy the natural gas on site so that it can be transported by tanker to markets.

A variety of processes for liquefying natural gas are known. In most of these processes, the natural gas is treated to remove acid gases, water and hydrocarbons heavier than about $C_3$ as necessary prior to liquefaction. Known refrigeration processes comprise processes that may use multiple pure component refrigerants, multi-component refrigerants or combinations thereof. Refrigeration processes using one or more refrigerant sections and the like may be used. A variety of such processes are known and could be used with the present invention. All such processes generally require that a compressed refrigerant be made available at a pressure such that upon cooling it can be liquefied and thereafter vaporized to produce the refrigeration required to liquefy the natural gas.

Most such processes are quite energy intensive and require substantial energy input to compress the refrigerant for repeated cycling through a refrigeration zone to produce the refrigeration necessary to at least partially liquefy the natural gas and the like. Further, substantial energy may be required in many instances to recompress the natural gas after treatment to remove acid gases and water from the natural gas or to remove heavier hydrocarbons from the natural gas. All these processes typically require large quantities of electrical power and mechanical energy with the resultant emission of large quantities of carbon dioxide ($CO_2$) into the atmosphere.

Recently it has been considered that release of $CO_2$ into the atmosphere is detrimental to the atmosphere. Accordingly, it has been deemed desirable that the amount of $CO_2$ emitted in such processes should be reduced. Typically such processes have been operated in areas where there was an abundance of cheap fuel. Therefore, little concern has been directed to limiting the emission of $CO_2$ into the atmosphere since it was more convenient and economical to simply discharge combustion exhaust streams into the atmosphere than to limit the amount of fuel consumed since such fuel is readily available at little or no cost at the liquefaction site. As well known to those skilled in the art, hydrocarbon fuels, especially light hydrocarbon gases, have been used widely for generation of electrical power and for production of mechanical energy via light hydrocarbon gas fired turbines and the like.

Recently, it has become apparent that it would be desirable to provide a system and a process for providing compressed refrigerant and electrical power for a light hydrocarbon gas liquefaction process wherein reduced emissions of $CO_2$ were produced and wherein the mechanical energy and electrical power for the process could be produced on site.

SUMMARY OF THE INVENTION

The present invention comprises a reduced carbon dioxide emission method for providing power for refrigerant compression and shared electrical power for a light hydrocarbon gas liquefaction process, the method comprising: a) compressing a refrigerant in a refrigerant compressor at least partially driven by at least one light hydrocarbon gas-fired turbine to produce the compressed refrigerant with the turbine producing an exhaust gas stream at an elevated temperature; b) producing steam at an elevated temperature and pressure from water or low-pressure steam by heat exchange with the exhaust gas stream; c) driving a steam turbine with the steam from b) to produce mechanical power; and d) driving an electrical power generator with the mechanical power from c) to produce electrical power for use in the light hydrocarbon gas liquefaction process.

The invention further comprises a reduced carbon dioxide emission system for providing power for refrigerant compression and shared electrical power for a light hydrocarbon gas liquefaction process, the system comprising: a) a refrigerant compressor having a low-pressure gaseous refrigerant inlet and an increased pressure refrigerant outlet and shaft coupled to a light hydrocarbon gas-fired turbine with the turbine having a high-temperature exhaust gas outlet; b) a heat exchanger having a water or a low-pressure steam inlet, a steam outlet, a high-temperature exhaust gas inlet in fluid communication with the high-temperature exhaust gas outlet and a reduced temperature exhaust gas outlet so that the high-temperature exhaust gas passes in heat exchange with the water or low-pressure steam to produce steam; c) an electric generator driven by the steam to produce electrical power for use in the light hydrocarbon gas liquefaction process; and, d) a line in fluid communication with the increased pressure refrigerant outlet and a compressed refrigerant inlet to the light hydrocarbon gas liquefaction process.

BRIEF DESCRIPTION OF THE DRAWINGS

The drawing is a schematic diagram of a system for providing power for refrigerant compression and shared electrical power for a light hydrocarbon gas liquefaction process with reduced carbon dioxide emissions to the atmosphere.

DESCRIPTION OF THE PREFERRED EMBODIMENTS

In the description of the FIGURE, the same numbers will be used throughout to refer to the same or similar components. It should be understood that many compressors, valves, motors and other equipment well known to the art and required to achieve the flows shown have not been shown for simplicity.

In the FIGURE, turbines 10 and 10' are shown and are shaft coupled via shafts 12 and 12' to compressors 14 and 14'. Compressors 14 and 14' may be axial, centrifugal or the like compressors and are used to compress fresh or spent refrigerant from a natural gas liquefaction plant facility 64. The spent refrigerant is recovered from facility 64 through lines 48 and 50 and directed to turbines 14 and 14' respectively. Alternatively, the spent refrigerant may be returned via a single line and passed to one or both turbines. The liquefied natural gas (LNG) is recovered via a line 70 and passed to storage in LNG storage and export facilities 72 from which a boil-off gas stream 74 is recovered and passed to facility 64.

The term "compressors" as used herein refers to single stage compressors or multi-stage compressors with or without interstage cooling or interstage cooling with liquids separation. The compressors may be axial, centrifugal or the like compressors.

While the FIGURE shows two turbines with two refrigerant compressors, it should be understood that fewer or more turbines with compressors could be used dependent upon the compressed refrigerant needs of the process. In many instances, additional refrigerant zones may be added as units to an overall light hydrocarbon gas liquefaction process to increase capacity. In such instances, more turbines and compressors could readily be added. The present invention contemplates that the turbines and compressors may be added or reduced as required to produce the desired amount of compressed refrigerant.

Compressors 14 and 14' produce compressed refrigerant streams 52 and 54, which may be directed via a line 52 and a line 54 to facility 64. The refrigerant streams may be introduced as separate streams or together. Further the streams in lines 52 and 54 may be at different pressures and may comprise different refrigerants if desired. Such variations are well known to those skilled in the art and in some refrigeration processes it is desired to introduce two or more compressed refrigerant streams, which may be introduced at the same or different pressures at separate locations in the refrigeration zone. It is contemplated in the present invention that the compressed refrigerant can be produced at substantially any desired pressure (typically from about 1 to about 75 bara), and as well known to those skilled in the art, may be cooled by heat exchange with air, water or the like prior to passage to natural gas refrigeration zone.

While the present invention is not limited to any particular natural gas liquefaction process, it is pointed out that the compressed refrigerant may be further cooled in the refrigeration zone and thereafter vaporized to produce cold refrigerant used to liquefy natural gas. The natural gas passed into facility 64 via a line 66 is typically treated to at least partially remove acid gases and water as necessary. In many instances, heavier hydrocarbons ($C_3+$) have also typically been removed. There are a variety of processes for making such separations. The present invention is not limited to any type of recovery of any of these materials since it is primarily directed to a method for producing power for refrigerant compression and shared electrical power for the light hydrocarbon gas liquefaction process.

Turbines 10 and 10', typically comprise an air compression section (not shown), which may be an axial compressor, a centrifugal compressor, or the like wherein air from lines 18 and 18' is compressed to a high-pressure (typically from about 350 to about 800 psia) and then mixed with a fuel gas stream supplied through gas inlets 20 and 20' at a pressure close to that of the air to turbines 10 and 10' (typically from about 350 to about 800 psia). The fuel gas and air are combusted to produce a hot gaseous stream at a pressure suitable to drive turbines 10 and 10'. The exhaust gas stream is recovered through lines 22 and 22' and a line 24 (typically from about 800 to about 1600° F.) and may be passed to a heat exchanger 26 where high-pressure steam is generated. Any suitable heat exchanger may be used.

A variety of techniques such as the use of countercurrent heat exchangers and the like may be used to produce the steam (typically from about 400 to about 1200 psi) from either water or from low-pressure steam. While not shown in the FIGURE, low-pressure steam after use to drive a turbine or expander could be recycled to heat exchanger 26 and reheated for recycle as higher pressure steam. The higher pressure steam is recovered through a line 28 and passed to a turbine or expander 30 where it provides mechanical energy via a shaft 32 to drive an electrical generator 34 to produce electrical power, which is shown schematically as being recovered through a line 36. The spent steam (typically at a pressure less than about 20 psi) is shown as a discharge from the process through a line 44, although as mentioned previously, this stream could be recycled for reheating in heat exchanger 26 since it will comprise low-pressure steam or water that has been suitably treated for use to produce steam.

The electrical power produced and recovered through line 36 can be passed via a line 42 to the power grid for the process where it can constitute some or all of the electrical power used in the process and as shown the electrical power may be used by passing a portion of the electricity through a line 38 to drive starter/helper motors 16 and 16', which are shaft coupled or otherwise coupled to turbines and 10 and 10'. These helper motors are large electrical motors used in many instances for start up operations with turbines 10 and 10'. They also generate substantial power and may be left in operation after the turbines have been started. These electrical motors produce substantial shaft power and as shown are powered by electrical power generated in the process.

The exhaust gases from line 24, after heat exchange in heat exchanger 26, are typically passed to suitable treatment and discharge as shown via a line 46.

In the discussion of the FIGURE, the terms light hydrocarbon gas and natural gas have been used interchangeably in some instances. The most frequently liquefied light hydrocarbon gas is natural gas and typically as liquefied the natural gas is primarily methane. This is the result of the removal of the heavier hydrocarbons which may have higher value as separate streams than as a part of the liquefied natural gas stream and further because pipeline specifications frequently require a heating value which is lower than provided by liquefied natural gas which contains substantial quantities of heavier hydrocarbons.

Additional compressor motors, pumps and the like (not shown) are typically powered by electrical power. According to the present invention, the electrical power for all or a substantial portion of these operations can be provided by the generation of electrical power as shown in the FIGURE.

By comparison to a process that uses the exhaust stream from the turbines for other purposes or simply exhausts it to the atmosphere without heat recovery and which uses electrical power generated by the combustion of fossil fuels as the primary source of electricity, the amount of $CO_2$ discharged to the atmosphere by the method of the present invention has been reduced by up to 60 percent. Typically reductions of at least 35 percent are achieved. The reductions are typically in a range from about 40 to about 60 percent.

The foregoing description of the FIGURE is illustrative of both the system and the method of the present invention. The equipment and its interaction have been discussed above.

According to the method of the present invention, a light hydrocarbon gas process is provided with a compressed refrigerant by compressing a refrigerant with a refrigerant compressor powered by a turbine that produces an exhaust gas stream at elevated temperature with the exhaust gas stream then being used to produce steam which is at a suitable pressure to drive an electrical power generator with the steam to produce electrical power for the light hydrocarbon gas liquefaction process.

As noted previously, the present invention is not directed to any particular light hydrocarbon gas liquefaction process, but is considered to be applicable to and useful with all such liquefaction processes which require a compressed refrigerant and electrical power for use to drive selected components of the process equipment and the like.

The temperatures and pressures required for the compressed refrigerant may vary widely dependent upon the particular refrigeration process to which the compressed refrigerant is provided. Similarly, the temperature of the exhaust gases from the turbines may vary within limits known to those skilled in the art. For instance, typically turbines such as a Frame 7 turbine (for example a Model MS 7001EA turbine available from the General Electric Company) have been used for such applications. Other turbines could be used if desired, such as a Frame 5 turbine (for example Models MS5002C or MS5002D) and Frame 9 turbines, all available from the General Electric Company. The temperature of the exhaust gas may vary dependent upon the particular turbines chosen. Similarly, the pressure and temperature of the steam produced may vary within reasonably wide limits as known to those skilled in the art while still providing the ability to drive an expander or turbine to produce the electrical power required.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A reduced carbon dioxide emissions method for providing power for refrigerant compression and shared electrical power for a light hydrocarbon gas liquefaction process, the method comprising:
   a) compressing a refrigerant in a refrigerant compressor driven by at least one light hydrocarbon gas-fired turbine to produce all of the compressed refrigerant for the light hydrocarbon gas liquefaction process with the at least one turbine producing power solely for driving the compressor and an exhaust gas stream at an elevated temperature;
   b) passing all of the exhaust gas stream to a heat exchanger and producing steam at an elevated temperature and pressure from water or low-pressure steam by heat exchange with the exhaust gas stream;
   c) driving a steam turbine unconnected mechanically to the light hydrocarbon gas-fired turbine or refrigerant compressor with the steam from b); and,
   d) driving an electrical power generator with the steam from b) to produce electrical power for use in the light hydrocarbon gas liquefaction process.

2. The method of claim 1 wherein a plurality of refrigerant compressors and turbines are used.

3. The method of claim 1 wherein the gas-fired turbine is fueled by a compressed air stream and a light hydrocarbon gas stream.

4. The method of claim 3 wherein the air stream and the light hydrocarbon gas stream are combusted to produce a high-temperature, high-pressure gas stream which drives the gas-fired turbine.

5. The method of claim 3 wherein the compressed air stream is produced by an axial compressor or a centrifugal compressor.

6. The method of claim 1 wherein the electrical power is used on the electrical grid for the light hydrocarbon gas liquefaction process.

7. The method of claim 1 wherein the gas-fired turbine is partially driven by a starter/helper electric motor which is coupled to the turbine.

8. The method of claim 1 wherein the carbon dioxide emissions from the light hydrocarbon gas liquefaction process are reduced by at least 35 percent by comparison to a comparable plant wherein the exhaust gas stream is used for other purposes and wherein electrical power produced by fossil fuel combustion is used as the primary source of electrical power for the electrical grid.

9. The method of claim 1 wherein the light hydrocarbon gas is natural gas.

10. The method of claim 9 wherein at least a portion of the acid gases and at least a portion of hydrocarbon gases heavier than about $C_3$ have been removed from the natural gas.

11. A reduced carbon dioxide emission system for providing power for refrigerant compression and shared electrical power for a light hydrocarbon gas liquefaction process:
   a) a refrigerant compressor having a low-pressure gaseous refrigerant inlet and an increased pressure refrigerant outlet and shaft coupled to and driven by a light hydrocarbon gas-fired turbine with the turbine having a high-temperature exhaust gas outlet, the refrigerant compressor compressing all the compressed refrigerant for the light hydrocarbon gas liquefaction process;
   b) a heat exchanger having a water or a low-pressure steam inlet and a high-pressure steam outlet and a high-temperature exhaust gas inlet in fluid communication with the high-temperature exhaust gas outlet and a reduced temperature exhaust gas outlet so that all of the high-temperature exhaust gas passes in heat exchange with the water or low-pressure steam to produce high-pressure steam;
   c) an electric generator unconnected mechanically to the refrigerant compressor or the light hydrocarbon gas-fired turbine and driven by the high-pressure steam to produce electrical power for use in the light hydrocarbon gas liquefaction process; and, d) a line in fluid communication with the increased pressure refrigerant outlet and a compressed refrigerant inlet to the light hydrocarbon gas liquefaction process.

12. The system of claim 11 wherein the system includes a plurality of compressors, turbines, heat exchangers and electric generators.

13. The system of claim 11 wherein the turbine includes an inlet for a high-pressure air stream.

14. The system of claim 11 wherein an axial compressor or a centrifugal compressor is coupled to the turbine to produce a high-pressure air stream.

15. The system of claim 14 wherein the system includes a combustion zone having a high-pressure air stream inlet and a light hydrocarbon gas inlet wherein the high-pressure air stream and the light hydrocarbon gas stream are combusted to produce the high-pressure gas stream.

16. The system of claim 11 wherein the low-pressure gaseous refrigerant is recovered from a refrigerant discharge outlet from the light hydrocarbon gas liquefaction process and passed to the low-pressure gaseous refrigerant inlet.

17. The system of claim 11 wherein the carbon dioxide emissions from the light hydrocarbon gas liquefaction process are reduced by at least 35 percent by comparison to a comparable plant wherein the exhaust gas stream is used for other purposes and wherein electrical power produced by fossil fuel combustion is used as the primary source of electrical power for the electrical grid.

18. The system of claim 11 wherein the system includes an electrical motor shaft coupled to the turbine with the electrical motor being at least partially powered by electricity produced by the electric generator.

19. A reduced carbon dioxide emissions method for providing power for refrigerant compression and shared electrical power for a light hydrocarbon gas liquefaction process from which the carbon dioxide emissions are reduced by from about thirty-five to about sixty percent, the method consisting essentially of:

a) compressing a refrigerant in a refrigerant compressor at least partially driven by a light hydrocarbon gas-fired turbine to produce all of the compressed refrigerant for the light hydrocarbon gas liquefaction process with the turbine producing power solely for driving the compressor and an exhaust gas stream at a resulting elevated temperature;

b) passing all of the resulting exhaust gas stream to a heat exchanger and producing steam at an elevated temperature and pressure from water or low-pressure steam by heat exchange with the exhaust gas stream;

c) driving a steam turbine unconnected mechanically to the light hydrocarbon gas-fired turbine or refrigerant compressor with the steam from b); and, d) driving an electrical power generator with the steam from b) to produce electrical power for use in the light hydrocarbon gas liquefaction process.

20. A reduced carbon dioxide emission system for providing power for refrigerant compression and shared electrical power for a light hydrocarbon gas liquefaction process from which the carbon dioxide emissions are reduced by from about thirty-five to about sixty percent, the system comprising:

a) a refrigerant compressor having a low-pressure gaseous refrigerant inlet and an increased pressure refrigerant outlet and shaft coupled to and driven by a light hydrocarbon gas-fired turbine with the turbine having a high-temperature exhaust gas outlet, the refrigerant compressor compressing all the compressed refrigerant for the light hydrocarbon gas liquefaction process;

b) a heat exchanger having a water or a low-pressure steam inlet and a high-pressure steam outlet and a high-temperature exhaust gas inlet in fluid communication with the high-temperature exhaust gas outlet and a reduced temperature exhaust gas outlet so that all of the high-temperature exhaust gas passes in heat exchange with the water or low-pressure steam to produce high-pressure steam;

c) an electric generator unconnected mechanically to the refrigerant compressor or the light hydrocarbon gas-fired turbine and driven by the high-pressure steam to produce electrical power for use in the light hydrocarbon gas liquefaction process; and, d) a line in fluid communication with the increased pressure refrigerant outlet and a compressed refrigerant inlet to the light hydrocarbon gas liquefaction process.

* * * * *